United States Patent
Kumada et al.

(10) Patent No.: US 7,988,880 B2
(45) Date of Patent: Aug. 2, 2011

(54) SPINEL TYPE LITHIUM TRANSITION METAL OXIDE

(75) Inventors: Naoki Kumada, Takehara (JP); Shinya Kagei, Takehara (JP); Yoshimi Hata, Takehara (JP); Kenji Sasaki, Takehara (JP); Yasuhiro Ochi, Takehara (JP); Keisuke Miyanohara, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 12/739,075

(22) PCT Filed: Oct. 23, 2008

(86) PCT No.: PCT/JP2008/069191
§ 371 (c)(1),
(2), (4) Date: Apr. 21, 2010

(87) PCT Pub. No.: WO2009/054436
PCT Pub. Date: Apr. 30, 2009

(65) Prior Publication Data
US 2010/0243952 A1   Sep. 30, 2010

(30) Foreign Application Priority Data

Oct. 23, 2007 (JP) ................. 2007-275500
Sep. 16, 2008 (JP) ................. 2008-237043

(51) Int. Cl.
*H01M 4/88* (2006.01)
*H01B 1/08* (2006.01)
*C01D 1/02* (2006.01)
*C01G 45/02* (2006.01)
*C01F 7/00* (2006.01)

(52) U.S. Cl. ............ 252/182.1; 252/518.1; 252/521.4; 423/594.15; 423/594.16; 423/599; 423/600

(58) Field of Classification Search .......... 423/594.15, 423/594.16, 599, 600; 252/518.1, 521.4, 252/182.1
See application file for complete search history.

(56) References Cited

U.S. PATENT DOCUMENTS 6,696,200 B1 * 2/2004 Yoshimura et al. ........ 429/231.1
(Continued)

FOREIGN PATENT DOCUMENTS

EP   1233001 A2   8/2002
(Continued)

OTHER PUBLICATIONS

Hibino, Mitsuhiro et al, "Improvement of cycle life of spinel type of lithium manganese oxide by addition of other spinel compounds during synthesis", Solid State Ionics, 2006, pp. 2653-2656, No. 177, Elsevier B.V.

(Continued)

*Primary Examiner* — Mark Eashoo
*Assistant Examiner* — Peter F Godenschwager
(74) *Attorney, Agent, or Firm* — The Webb Law Firm

(57) ABSTRACT

In order to provide a novel spinel type lithium transition metal oxide (LMO) having excellent power performance characteristics, in which preferably both the power performance characteristics and the cycle performance at high temperature life characteristics may be balanced, a novel spinel type lithium transition metal oxide with excellent power performance characteristics is proposed by defining the inter-atomic distance Li—O to be 1.978 Å to 2.006 Å as measured by the Rietveld method using the fundamental method in a lithium transition metal oxide represented by the general formula $Li_{1+x}M_{2-x}O_4$ (where M is a transition metal consisting of three elements Mn, Al and Mg and x is 0.01 to 0.08).

20 Claims, 6 Drawing Sheets

U.S. PATENT DOCUMENTS

| | | |
|---|---|---|
| 6,814,894 B2 | 11/2004 | Shoji et al. |
| 6,924,064 B2 * | 8/2005 | Kondo et al. ............ 429/231.95 |
| 2002/0158233 A1 * | 10/2002 | Shoji et al. .................... 252/500 |

FOREIGN PATENT DOCUMENTS

| | | |
|---|---|---|
| JP | 11045710 A | 2/1999 |
| JP | 2000159522 A | 6/2000 |
| JP | 2001106528 A | 4/2001 |
| JP | 2001180939 A | 7/2001 |
| JP | 2001223006 A | 8/2001 |
| JP | 2002033101 A | 1/2002 |
| JP | 2002316823 A | 10/2002 |
| JP | 2004186149 A | 7/2004 |
| JP | 2004356092 A | 12/2004 |
| WO | 2004049474 A1 | 6/2004 |

OTHER PUBLICATIONS

Ishizawa, Nobuo et al., "Structural disorder along the lithium diffusion pathway in cubically stabilized lithium manganese spinel I. Synchrotron X-ray studies", Journal of Solid State Chemistry, 2003, pp. 167-174, No. 174, Elsevier Inc.

Ozawa, Naoshi et al., "Charge-Discharge Cycle Behavior of MgAl2)r-Doped LiMn2-O4 Cathode Material for Lithium-Ion Secondary Battery", Electrochemical and Solid-State Letters, 2003, pp. A106-A108, vol. 6 (6), The Electrochemical Society, Inc.

* cited by examiner

SPINEL TYPE LITHIUM TRANSITION METAL OXIDE

FIELD OF THE INVENTION

The present invention relates to a lithium transition metal oxide (also referred in the present invention to "spinel type lithium transition metal oxide" or "LMO") having a spinel structure (Fd3-m), which can be used as a positive electrode active material for a lithium battery, and which, in particular, can be used suitably as a positive electrode active material of a large battery that equips an electric vehicle (EV: Electric Vehicle), a hybrid electric vehicle (HEV: Hybrid Electric Vehicle) or the like.

BACKGROUND OF THE INVENTION

Lithium batteries, in particular lithium secondary batteries, having such characteristics as a large energy density and a long life span, are used widely as power sources for home appliances such as video cameras and portable electronic devices such as notebook personal computers and cellular phones; recently, applications into large batteries that equip an electric vehicle (EV), a hybrid electric vehicle (HEV) and the like, are anticipated.

A lithium secondary battery is a secondary battery having a structure in which, during charging, lithium melts out from the positive electrode as an ion and moves towards the negative electrode to be stored and conversely, during discharging, the lithium ion returns from the negative electrode to the positive electrode, and it is known that the high energy density of the battery has its source in the electric potential of the positive electrode material.

In addition to lithium transition metal oxides such as $LiCoO_2$, $LiNiO_2$ and $LiMnO_2$ having a layer structure, spinel type lithium transition metal oxide (LMO) of the manganese series such as $LiMnO_4$ and $LiNi_{0.5}Mn_{0.5}O_4$ are known as positive electrode active materials for lithium secondary batteries.

Owing to low raw material costs and the absence of toxicity, which renders it safe, there is a focus on the spinel type lithium transition metal oxide (LMO) of the manganese series as a positive electrode active material for a large battery for an electric vehicle (EV), a hybrid electric vehicle (HEV) and the like. In addition, while excellent power performance characteristics are particularly demanded of a battery for an EV or HEV, on this point, compared to a lithium transition metal oxide such as LiCoO2, which has a layer structure, a spinel type lithium transition metal oxide (LMO), which allows for insertion and desorption of Li ions three-dimensionally, has excellent power performance characteristics. However, with higher efficiency of hybrid electric vehicles (HEVs), currently, further improvement of the power performance characteristics are demanded of the positive electrode active material for HEV batteries.

As a spinel type lithium transition metal oxide (LMO) with improved power performance characteristics, in conventional art, a lithium manganese composite oxide represented by the composition formula $Li1_{+x}$, $Mn_{2-x}O_{u-y}F_y$ (where $0.02 \leq x$, $0.1 \leq y \leq u$, $3 \leq (2u-y-1-x)/(2-x) \leq 4$ and $3.9 \leq u \leq 4.1$) having a mean particle diameter in the range of 1 to 20 μm is described in Patent Reference 1.

In addition, an Li—Mn series spinel compound represented by the composition formula $Li_{1+x}Mn_{2-x-y}Mg_yO_4$ (x=0.03 to 0.15, y=0.005 to 0.05) having a specific surface area of 0.5 to 0.8 $m^2/g$ and a sodium content of 1000 ppm or less is described in Patent Reference 2.

Meanwhile, when cycles are repeated in a high temperature region (for instance, 45 to 60° C.) with a conventional spinel type lithium transition metal oxide (LMO), $Mn^{2+}$ becomes more prone to elution and the eluted $Mn^{2+}$ deposits on the negative electrode, which becomes a resistance and causes deterioration of the capacity; thus, it has been told that when putting a spinel type lithium transition metal oxide (LMO) into practical application, the issue lies in the cycle life characteristics in the high temperature region (for instance 45 to 60° C.).

Consequently, in conventional art, as means to increase the cycle life characteristics of spinel type lithium transition metal oxides (LMOs), a method has been proposed, for instance in Patent Reference 3 or the like, whereby a portion of Mn within an LMO is substituted with another element such as Al, thereby stabilizing the spinel structure, suppressing the elution of Mn and suppressing the deterioration of the LMO.

[Patent Reference 1] Japanese Patent Application Laid-open No. H11-045710

[Patent Reference 2] Japanese Patent Application Laid-open No. 2002-033101

[Patent Reference 3] Japanese Patent Application Laid-open No. 2004-186149

SUMMARY OF THE INVENTION

The present invention provides a novel spinel type lithium transition metal oxide (LMO) having excellent power performance characteristics, in which preferably both the power performance characteristics and the cycle performance at high temperature life characteristics may be balanced.

The present invention proposes a spinel type (Fd3-m) lithium transition metal oxide, which is a lithium transition metal oxide represented by the general formula $Li_{1+x}M_{2-x}O_4$ (where M is a transition metal consisting of three elements Mn, Al and Mg and x is 0.01 to 0.08), in which the inter-atomic distance Li—O is 1.978 Å to 2.006 Å as measured by the Rietveld method using the fundamental method.

It was found that, in a spinel type lithium transition metal oxide of the manganese series containing Al and Mg in addition to Mn as transition metals, defining the inter-atomic distance Li—O to be in a given range allowed the power performance characteristics to be increased significantly when using the LMO as a positive electrode active material of a lithium secondary battery.

In addition, the present invention proposes a spinel type lithium transition metal oxide further having a crystallite size that is defined to be 170 nm to 490 nm in the above spinel type lithium transition metal oxide.

It was found that defining the crystallite size to be 170 nm to 490 nm in this way can improve cycle performance at high temperature life characteristics, allowing both the power performance characteristics and the cycle performance at high temperature life characteristics to be balanced.

As described above, since the spinel type lithium transition metal oxide of the present invention has excellent power performance characteristics and preferably can balance power performance characteristics and cycle performance at high temperature life characteristics, in addition to being usable as positive electrode active material of a battery for so-called consumer use, for instance, such as for notebook personal computers, cellular phones, cordless phone handsets, video movies, liquid crystal televisions, electric shavers, portable radios, headphone stereos, backup power sources, pace maker and hearing aids, it can be used suitably as a positive electrode active material in particular of large batteries that equip EVs, HEVs and the like.

DETAILED DESCRIPTION OF THE INVENTION

Figure 1:
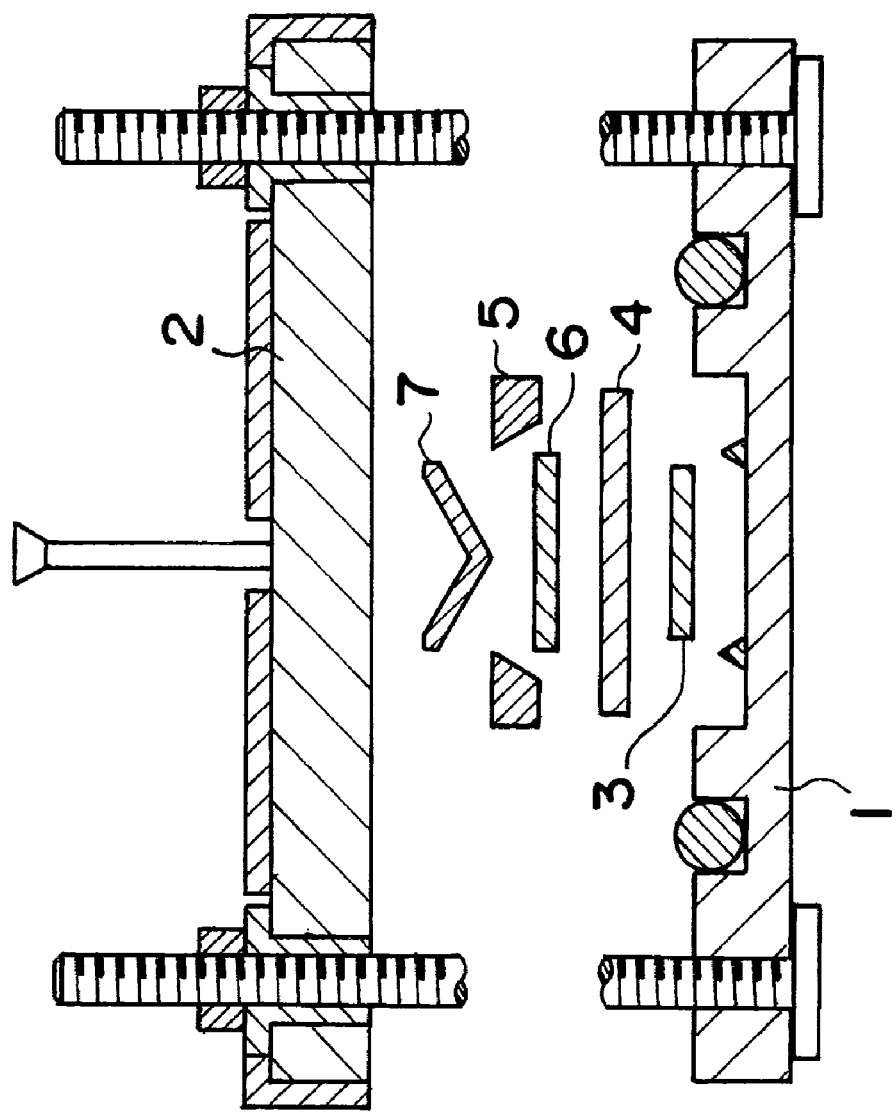
FIG. 1 depicts the constitution of an electrochemical cell fabricated in order to evaluate the battery characteristics of samples obtained in the examples and comparative examples.

Embodiments of the present invention will be described hereinafter. However, the scope of the present invention is not limited to the embodiments described below.

The lithium transition metal oxide of the present embodiment (hereinafter referred to as "the present LMO") contains a spinel type lithium transition metal oxide, which is a spinel type (Fd3-m) lithium transition metal oxide represented by the general formula (1) $Li_{1+x}M_{2-x}O_4$ (where M is a transition metal including Mn, Al and Mg and x is 0.01 to 0.08), in which the inter-atomic distance Li—O is 1.971 Å to 2.006 Å as measured by the Rietveld method using the fundamental method.

In the present invention, unless expressly stated otherwise, "contains" implies the meaning of allowing other constituents to be contained to such an extent that the functions of the main constituent cannot be prevented. Although not to specify the proportional content of the main constituent, occupying at least 50 percent in mass or more, in particular 70 percent in mass or more, of which 90 percent in mass or more, of which 95 percent in mass or more (including 100%) is desirable.

For instance, the present LMO may contain $SO_4$ as impurity if 1.5 percent in weight or less and other elements if 0.5 percent in weight or less respectively. This is because amounts on these orders are thought to have almost no effects on the performance of the present LMO.

(Spinel Structure)

The present LMO preferably includes a lithium transition metal oxide represented by the general formula (2) $Li(Li_xMg_yAl_zMn_{2-x-y-z})O_4$ (where $0.01 \leq x \leq 0.08$, $0.02 \leq y \leq 0.07$ and $0.06 \leq z \leq 0.14$).

In the general formula (2) "x" is preferably 0.01 to 0.08, of which 0.01 to 0.05 and in particular 0.01 to 0.03 are more desirable.

In addition, "y" is preferably 0.02 to 0.07, of which 0.02 to 0.06 and in particular 0.02 to 0.04 are more desirable.

In addition, "z" is preferably 0.06 to 0.14, of which 0.07 to 0.13 and in particular 0.11 to 0.13 are more desirable.

Note that, since those with a spinel structure in general contain oxygen defects, the atom ratio "4" for the oxygen in the above general formula (2) is meant to allow some degree of non-stoichiometry (for instance $4-\delta(0 \leq \delta)$ to be included, and a portion of the oxygens may be substituted with fluorine.

(Inter-Atomic Distance Li—O)

The present LMO is one in which the inter-atomic distance Li—O is defined in the spinel type lithium transition metal oxide of the manganese series containing Al and Mg in addition to Mn as transition metals, and the inter-atomic distance in this case is the distance between the nearest-neighboring sites having a value that is measured by the Rietveld method using the fundamental method.

In the present LMO, it is important that the inter-atomic distance Li—O is 1.971 Å to 2.006 Å as measured by the Rietveld method using the fundamental method. Defining the inter-atomic distance Li—O to be 1.971 Å to 2.006 Å allows the power performance characteristics to be increased significantly when using the LMO as a positive electrode active material of a lithium secondary battery. From this point of view, the inter-atomic distance Li—O of 1.971 Å to 2.004 Å is desirable, in particular 1.978 Å to 2.004 Å is desirable, of which in particular 1.978 Å to 1.990 Å is desirable.

(Inter-Atomic Distance Mn—O)

In the present LMO, an inter-atomic distance Mn—O as measured by the Rietveld method using the fundamental method of 1.932 Å to 1.948 Å is desirable, and in particular 1.933 Å to 1.945 Å, of which in particular 1.940 Å to 1.945 Å is desirable. Defining the inter-atomic distance Mn—O to be 1.932 Å to 1.948 Å allows the power performance characteristics to be increased more significantly when using the LMO as a positive electrode active material of a lithium secondary battery.

Note that the inter-atomic distance Mn—O is also the distance between the nearest-neighboring sites having a value that is measured by the Rietveld method using the fundamental method.

(Crystallite Size)

In the present LMO, a crystallite size of 170 nm to 490 nm is desirable, in particular 170 nm to 480 nm, of which 200 nm to 360 nm is more desirable, of which 220 nm to 360 nm is all the more desirable.

Defining crystallite size of the present LMO to be 170 nm to 490 nm allows the cycle performance at high temperature life characteristics to be improved, allowing the power performance characteristics and the cycle performance at high temperature life characteristics to be balanced.

Here, "crystallite" means the maximum group deemed a single crystal, which can be determined by XRD measurements and performing a Rietveld analysis.

Note that, the Li—O distance and crystallite size of the spinel type lithium transition metal oxide in the initial state can be determined by measuring the Li—O distance and crystallite size in the spinel type lithium transition metal oxide after use as a positive electrode active material of a battery, that is to say, after charge-discharge.

To measure the Li—O distance and crystallite size of the spinel type lithium transition metal oxide after charge-discharge, it suffices to disassemble the battery and take out the spinel type lithium transition metal oxide, then, prepare a spinel type lithium transition metal oxide in a discharged state down to 3.0V in counter electrode lithium equivalents, seal it in a polyethylene bag under argon atmosphere, and measure the Li—O distance and crystallite size with a measurement range of 30 to 120° for the XRD diffraction angle 2θ. In so doing, the reason for measuring at 30° or greater is because if less than 30%, in a region, there are diffraction peaks of conducting materials and binder, affecting the diffraction intensities of spinel type lithium transition metal oxide, and thus to avoid this influence.

It is known that the Li—O distance of a spinel type lithium transition metal oxide measured after charge-discharge in this way decreases approximately 0.1 angstroms compared to the initial state, that the crystallite size decreases to approximately 60% of the initial state in the case of a spinel type lithium transition metal oxide that does not contain boron (B), and that the decrease is to approximately 40% of the initial state in the case of a spinel type lithium transition metal oxide that contains boron (B). Thus, the Li—O distance and the crystallite size of the spinel type lithium transition metal oxide in the initial state can be determined by taking this decreasing fraction into account.

(Specific Surface Area)

For the specific surface area of the present LMO, 0.35 $m^2/g$ to 0.80 $m^2/g$ is desirable, and in particular 0.35 $m^2/g$ to 0.60 $m^2/g$, of which in particular 0.38 $m^2/g$ to 0.50 $m^2/g$ is more desirable.

The amount of Mn elution can be decreased by defining the specific surface area of the present LMO to be 0.80 $m^2/g$ or less, and capacity can be maintained by defining it to be 0.35 $m^2/g$ or greater.

The specific surface area may be measured by a well known method for measuring BET specific surface area using the nitrogen adsorption method.

(Ingredient of Positive Electrode Active Material for Lithium Battery Containing Boron Compound)

In addition to the present LMO, a powder containing a boron compound (referred to as "the present powder") is even more desirable as an ingredient of a lithium battery positive electrode active material.

Compared to an LMO that does not contain a boron compound, a powder containing a boron compound along with the present LMO allows the filling density (tap density) to be increased as well as allowing the discharge capacity at high-load discharge (3 C) to be increased. That is to say, when firing a spinel type lithium transition metal oxide, adding a boron compound and firing can promote sintering of micro-particles which are assembled crystal particles of spinel type lithium transition metal oxide (LMO), allowing compact aggregated micro-particles (secondary particles) to be formed, such that the filling density (tap density) can be increased. At the same time, since the generation and growth of crystals of spinel type lithium transition metal oxide (LMO) can be promoted, the crystallite size of the spinel type lithium transition metal oxide can be increased, allowing the discharge capacity at high-load discharge (3 C) to be increased by decreasing the number of boundary surfaces in the primary particle.

In addition, if a spinel type lithium transition metal oxide is fired after a boron compound has been added, sintering is promoted and the specific surface area decreases, such that in general, obtaining a power performance becomes difficult; however, in the case of the present invention, by defining the inter-atomic distance Li—O to be in a given range, the power performance characteristics can be increased by facilitating the entry and exit of Li ions.

In so doing, it suffices that the boron compound is a compound containing boron (B element). Although it is thought that a boron compound added prior to firing is altered morphologically by firing, it is difficult to specify accurately the morphology thereof. However, as is verified in the following examples, from the fact that the boron (B element) exists in a state that is eluted by water, it has been verified that the B element is not a spinel constitutive element and is present outside the spinel as a boron compound in some form. Consequently, boron (B element) is not present in the spinel, and there is also no clear concentration gradient of boron (B element) on the surface and inside of the crystal particles.

Since a boron compound fulfills the role of promoting the sintering of spinel type lithium transition metal oxide (LMO) when firing spinel type lithium transition metal oxide as described above by adding a boron compound and firing, it is thought that other substances having the same effects, that is to say, substances having a melting point at the firing temperature or lower, for instance compounds such as vanadium compound ($V_2O_5$), antimony compound ($Sb_2O_3$) and phosphorus compound ($P_2O_5$), allow the same effects to be obtained.

Note that when a boron compound is included, a crystallite size of the present LMO of 500 nm to 2000 nm is desirable, in particular 750 nm to 1750 nm is more desirable, of which 1000 nm to 1750 nm is all the more desirable.

Defining the crystallite size of the present LMO to be 500 nm to 2000 nm decreases the number of boundary surfaces within the first order particle, allowing the discharge capacity at high-load discharge (3 C) to be increased.

To adjust the crystallite size in this way, in addition to controlling the firing temperature, adjustment is also possible by adding a boron compound and firing.

In addition, when a boron compound is included, the tap density of the present LMO (powder) can be set to 1.0 to 1.9 $g/cm^3$. In particular, 1.4 to 1.9 $g/cm^3$, of which in particular 1.6 to 1.8 $g/cm^3$ is more desirable.

In general, the spinel type lithium transition metal oxide (LMO) has a low tap density (filling density) compared to a lithium transition metal oxide such as LiCoO2 having a layer structure; however adding boron (B) and firing can increase the filling density (tap density), allowing it to be adjusted to the tap density in the range described above.

(Fabrication Method)

Hereinafter, a fabrication method for the present LMO will be described.

In the present LMO, as one means for adjusting the inter-atomic distance Li—O to be 1.971 Å to 2.006 Å, a method may be cited, whereby a given manganese raw material is used, and at firing, the proportion between the air contact surface area and the filling volume of lithium manganate raw materials is adjusted suitably.

As the given manganese raw material described above, it is desirable to use an electrolytic manganese dioxide (manganese dioxide obtained by electrolysis) having a proportion of weight loss when heated from 200° C. to 400° C. (referred to as "TG diminution amount"; TG diminution amount=(weight at 200° C. heating−weight at 400° C. heating)×100/weight prior to heating) of 2.7 percent in mass or more. It is thought that if the TG diminution amount is large, the volume of the pore portion from where the structural waters were removed increases, increasing the amount of infiltrating lithium compound, thereby increasing reactivity.

In addition, as concrete means for adjusting suitably the proportion between the air contact surface area and the lithium manganate raw materials filling volume at firing, for instance, adjusting the apparent density of the mixture raw materials, adjusting the filling amount of firing raw materials such as changing the filling height of the firing raw materials with respect to the open surface area of the firing container, changing the shape of the firing container and the like allow the proportion between the air contact surface area and the lithium manganate raw materials filling volume to be adjusted.

In addition, the rate of rise in firing temperature also influences the Li—O inter-atomic distance. Since with a sudden temperature rise, carbon dioxide due to the thermal decomposition of lithium carbonate is removed from specific locations, the reaction becomes heterogeneous, preventing the desired Li—O inter-atomic distance to be obtained, it is desirable to find an optimal rate of firing temperature increase.

Note that adjustment means other than those mentioned above are not excluded.

In addition, in the present LMO, in order to adjust the crystallite size to be 170 nm to 490 nm, it is desirable to adjust the firing temperature to a range that is higher than 800° C. However, if the firing temperature is exceedingly higher than 900° C., the crystallite size suddenly becomes large, resulting in an inability to obtain the preferred battery capabilities, thus it is desirable to adjust the firing temperature to be 800 to 900° C. The reason is thought to be that, since there are influences from the permeability of the electrolytic solution and the crystallite size, if the crystallite size increases exceedingly, the active points decrease due to the decreased crystallite boundary surfaces, and electrolytic solution is lacking at reaction sites.

Regarding means for adjusting the crystallite size as well, adjustment means other than those described above are not to be excluded.

The fabrication process for the present LMO may be similar to the fabrication process for a conventional LMO. That is to say, the LMO can be obtained for instance by mixing lithium raw materials, manganese raw materials, magnesium raw materials and aluminum raw materials, as necessary granulating, drying, firing, as necessary sorting, further, as necessary heating, and further, as necessary sorting.

In so doing, a boron compound may be added to and mixed with the lithium raw materials, manganese raw materials, magnesium raw materials and aluminum raw materials, and after wet grinding, granulated, dried and fired.

As described above, when firing a spinel type lithium transition metal oxide, adding a boron compound and firing can promote sintering of micro-particles which are assembled crystal particles of spinel type lithium transition metal oxide (LMO), allowing compact aggregated micro-particles (secondary particles) to be formed, such that the filling density (tap density) can be increased. At the same time, since the generation and growth of crystals of spinel type lithium transition metal oxide (LMO) can be promoted, crystallite size of the spinel type lithium transition metal oxide can be increased, allowing the discharge capacity at high-load discharge (3 C) to be increased by decreasing the number of boundary surfaces in the primary particles. In addition, if a spinel type lithium transition metal oxide is fired after a boron compound has been added, sintering is promoted and the specific surface area decreases, such that in general, obtaining a power performance becomes difficult; however, as described above, by defining the inter-atomic distance Li—O to be in a given range, the power performance characteristics can be increased.

Here, the lithium raw materials are not limited in particular and, for instance, lithium hydroxide (LiOH), lithium carbonate ($Li_2CO_3$), lithium nitrate ($LiNO_3$), $LiOH \cdot H_2O$, lithium oxide ($Li_2O$), other fatty acid lithium and lithium halides, and the like, may be cited. Among these, hydroxide salt, carbonic acid salt and nitric acid salt of lithium are desirable.

As for magnesium raw materials, there is no particular limitation and, for instance, magnesium oxide (MgO), magnesium hydroxide ($Mg(OH)_2$), magnesium fluoride ($MgF_2$), magnesium nitrate ($Mg(NO_3)_2$) and the like, may be used, among which magnesium oxide is desirable.

As for aluminum raw materials, there is no particular limitation. For instance, aluminum hydroxide ($Al(OH)_3$), aluminum fluoride ($AlF_3$) and the like may be used, among which aluminum hydroxide is desirable.

As the boron compound, it is desirable to use boric acid or lithium borate. As the lithium borate, for instance, those having various morphologies can be used, such as lithium metaborate ($LiBO_2$), lithium tetraborate ($Li_2B_4O_7$), lithium pentaborate ($LiB_5O_8$) and lithium perborate ($Li_2B_2O_5$), among which lithium tetraborate ($Li_2B_4O_7$) is desirable. This B element does not become a solid solute in the spinel, and provides the action of promoting sintering of the spinel in the firing process.

Adjusting the amount of boron compound added in a range that is greater than 0 percent in mass of the spinel type lithium transition metal as boron (B) element but not more than 0.3 percent in mass, in particular 0.0001 to 0.2 percent in mass, of which 0.01 to 0.18 percent in mass, and from there 0.05 to 0.16 percent in mass, is desirable.

For mixing the raw materials, there is no particular limitation regarding the method therefor as long as the mixing is homogeneous. For instance, it suffices to use a well known mixing machine such as a mixer, add each source simultaneously or in a suitable sequence and stir-mix wet or dry. In the case of wet mixing, it is desirable to add liquid media such as water and dispersant, wet-mix to obtain a slurry and grind the obtained slurry with a wet-grinding machine. In particular, it is desirable to grind to submicron order. After grinding to submicron order, performing granulation and firing can increase the homogeneity of each particle prior to firing reaction, allowing the reactivity to be increased.

While the raw materials mixed as described above may be fired as-is, they may be granulated to a given size and fired.

As long as the various raw materials that were ground in the previous step do not separate and are dispersed in the granulation particles, the granulation method may be wet or dry, extrusion granulation method, tumbling granulation method, fluidized granulation method, mixing granulation method, spray drying granulation method, compression molding granulation method, or flake granulation method using a roll or the like. However, if wet granulation is performed, drying thoroughly prior to firing is necessary. As far as drying methods, it suffices to dry by a well known method such as spray heat drying method, hot air drying method, vacuum drying method and freeze-drying method, among which spray heat drying method is desirable. It is desirable to perform spray heat drying method using a hot spray dryer (spray dryer). Granulating with a hot spray dryer (spray dryer) not only allows the particle size distribution to be sharper but also allows a preparation to contain aggregated particles (secondary particles) that aggregated spherically.

For firing, it is desirable to perform firing in a firing furnace, under air atmosphere, under oxygen gas atmosphere, under an atmosphere with adjusted oxygen partial pressure, or under carbon dioxide gas atmosphere, or under another atmosphere, so as to raise the temperature at a rate of rise in temperature of 50 to 200° C./hr and maintaining a temperature of 800 to 900° C. (: means the temperature when a thermocouple is brought into contact with the fired entity inside the firing furnace) for 0.5 to 30 hours. However, when firing along with a boron compound, firing is possible in a lower temperature region than the firing temperature described above.

There is no particular limitation on the type of firing furnace. For instance rotary kiln, stationary furnace and other firing furnaces may be used to perform firing.

As described above, since adjusting the shape of the firing container, the proportion of the amount of firing raw materials to fill with relative to the mouth surface area (open surface area) of the firing container, and the like can alter the inter-atomic distance Li—O, it is desirable to adjust these so as to be within the given range [of inter-atomic distance].

Since sorting after firing has the technical significances of adjusting the particle size distribution of the aggregated powder along with the elimination of foreign substances, sorting in such a way that the mean particle diameter (D50) is in the range of 1 μm to 75 μm is desirable.

(Characteristic and Application)

The present LMO or the present powder, as necessary after disintegration and sorting, can be used effectively as positive electrode active material for a lithium battery.

For instance, a positive electrode mixture can be prepared by mixing the present LMO or the present powder, a conductor comprising carbon black or the like and a binder comprising Teflon® binder or the like. Then, such a positive electrode mixture can be used for the positive electrode, a material capable of storing and releasing lithium, such as, for instance, lithium or carbon, can be used for the negative electrode, and a lithium salt such as lithium hexafluophosphate (LiPF6) dissolved in a mixed solvent such as ethylenecarbonate-dimethylcarbonate can be used for the non-aqueous electrolyte to construct a lithium secondary battery. However, limitation to a battery with such a constitution is not meant.

Since a lithium battery provided with the present LMO or the present powder as the positive electrode active material exerts both excellent life characteristics (cycle life characteristics) and power performance characteristics when used by repeating charge-discharge in the central region of the depth of charge-discharge (for instance 50-80% SOC), it is particularly excellent for applications in positive electrode active material of large lithium batteries, in particular, for use as power sources to drive motors that equip electric vehicles (EVs) and hybrid electric vehicles (HEVs). Note that an HEV is a vehicle that combines the use of two sources of driving forces: an electric motor and an internal combustion engine.

In addition, since the present powder has a high filling density (tap density) compared to conventional LMOs and the like, and furthermore, has a high discharge capacity during power performance and high-load discharge (3 C), it can be used suitably as a positive electrode active material in batteries that equip power tools, EVs, HEVs and the like, which are particularly demanding in terms of power performance characteristics.

Note that an HEV is a vehicle that combines the use of two sources of driving forces: an electric motor and an internal combustion engine.

In addition, "lithium battery" is meant to include all batteries containing lithium or lithium ion inside the battery, such as lithium primary battery, lithium secondary battery, lithium ion secondary battery and lithium polymer battery.

(Explanation of Expressions)

In the present Specification, when the expression "X to Y" (X and Y are any numbers) is used, unless explicitly mentioned otherwise, the meaning of "X or greater but Y or lower" is included and at the same time the meaning of "preferably greater than X" or "preferably less than Y" is included.

EXAMPLES

In the following, the present invention will be described further based on examples and comparative examples; however, the present invention is not to be limited to the examples indicated below.

<Measurements of the Inter-Atomic Distances Li—O and Mn—O and the Crystallite Size>

For the samples (powders) obtained in the examples and comparative examples, the inter-atomic distances Li—O and Mn—O and the crystallite size were measured by the Rietveld method using the fundamental method described in the following.

The Rietveld method using the fundamental method is a method whereby the structural parameters of a crystal are refined from the diffraction intensities obtained by powder x-ray diffraction or the like. It is a method in which a crystal structure model is hypothesized, and various parameters of this crystal structure are refined in such a way that the x-ray diffraction pattern derived by calculations from this structure matches as much as possible the actually measured x-ray diffraction pattern.

An x-ray diffractometer (D8 ADVANCE, manufactured by Bruker AXS) using a Cu—Kα beam was used for the measurements of x-ray diffraction patterns. Among the x-ray diffraction patterns obtained from the range of diffraction angle $2\theta=10$ to $120°$, eight peaks with strong intensities were analyzed using an analysis software (product name: Topas Version 3) to determine the inter-atomic distances Li—O and Mn—O and the crystallite size.

Note that, it was hypothesized that the crystal structure belonged to the cubic crystal from the space group FD3-m (Origin Choice2), and that Li was occupying the 8a site thereof, Mn, Mg, Al and an extra Li fraction x were occupying the 16d site thereof, and O was occupying the 32e site thereof, occupancy and atom displacement parameter Beq. of oxygen were fixed to 1, and with the fractional coordinates of oxygen serving as variables and watching for the indices representing the extent of the match between the observed intensities and the calculated intensities Rwp<8.0 and GOF<2.0, the calculation was performed repeatedly until they converged, as shown in the table. Note that the crystallite size was analyzed using the Lorentz function without introducing distortion in the calculation.

The instrument specifications, conditions and the like that were used for other measurements and Rietveld method analyses were as follows:

Detector: PSD
Detector Type: VANTEC-1
High Voltage: 5616V
Discr. Lower Level: 0.35V
Discr. Window Width: 0.15V
Grid Lower Level: 0.075V
Grid Window Width: 0.524V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.01630098Th <Measurement of the Specific Surface Area (BET Method)>

The specific surface areas of the samples (powders) obtained in the examples and the comparative examples were measured as described below.

First, 0.5 g of sample (powder) was weighed in a glass cell for MONOSORB LOOP (manufactured by Yuasa Ionics Inc., product name: MS-18), a specific surface area measurement device by the flow gas adsorption method, the interior of the glass cell was substituted with nitrogen gas for 5 minutes with a gas amount of 30 mL/min in a pretreatment device for the MONOSORB LOOP, and then heat treatment was carried out at 250° C. for 10 minutes in the above nitrogen gas atmosphere. Thereafter, the sample (powder) was measured by the BET one point method using the MONOSORB LOOP.

Note that the adsorption gas used during the measurement was a mixed gas of 30% nitrogen: 70% helium.

<Measurements of Mean Particle Diameter (D50), 10% and 90% Cumulative Diameters (D10 and D90), Dmax and CS>

The particle size distributions of the samples (powders) were measured as follows. Using a sample circulator ("Microtrac ASVR" manufactured by Nikkiso Co. Ltd.) for laser diffraction particle size distribution meter, sample (powder) was introduced in water, while at a flow rate of 40 mL/sec, 40 watts ultrasound was emitted for 360 seconds, then, the particle size distribution was measured using a laser diffraction particle size distribution meter "HRA (X100)" manufactured by Nikkiso Co. Ltd. to determine D50, D10, D90, Dmax and CS (specific surface area) from the obtained chart of volumetric standard particle size distribution. Note that when measuring, water passed through a 60 μm filter was used for the aqueous solvent, the solvent refractive index was 1.33, the particle transparency condition was reflective, the measurement range was 0.122 to 704.0 μm, the measurement time was 30 seconds and the mean value from two measurements was used as the measurement value.

<Measurement of Tap Density>

50 g of sample (powder) was into a 150 ml glass measuring cylinder, and the powder filling density when tapped 540 times with a stroke of 60 mm was determined by using a vibrating specific gravity meter (KRS-409 manufactured by Kuramochi Kagaku Kikai Seisakusho).

<Battery Evaluation>

(Battery Fabrication)

Li battery evaluation was carried out by the following method.

A paste was prepared by weighing accurately 8.80 g of positive electrode active material, 0.60 g of acetylene black (manufactured by Denki Kagaku Kogyo) and 5.0 g of a solution of 12 percent in weight PVDF (manufactured by Kishida Kagaku) dissolved in NMP (N-methylpyrrolidone), adding thereto 5 ml of NMP and mixing thoroughly. This paste was placed above an aluminum foil which serves as a collector, coated with an applicator adjusted to a gap of 250 μm and turned into a film, vacuum-dried overnight at 120° C., then, punched with 16 mmφ and compressed by pressing at 4 t/cm2 to be turned into a positive electrode. Immediately prior to battery fabrication, the adsorbed moisture was eliminated by vacuum drying at 120° C. for 120 min or longer, and fitted into the battery. In addition, the mean value of the weights of the 16 mmφ aluminum foils was pre-determined, the weight of the aluminum foil was subtracted from the weight of the positive electrode to determine the weight of the positive electrode mixture; in addition, the content in the positive electrode active material was determined from the mixing ratios of the positive electrode active material, acetylene black and PVDF.

The negative electrode was a 20 mmφ×1.0 mm thick metallic Li, and these materials were used to fabricate TOM-CELL®, a cell for electrochemical evaluation, shown in FIG. 1.

As to the electrochemistry cell of FIG. 1, a positive electrode 3 comprising the positive electrode mixture was positioned at the inner center of a lower body 1 made of organic electrolytic solution-resistant stainless steel. A separator 4 made of microporous polypropylene resin impregnated with an electrolytic solution was placed on the top surface of this positive electrode 3, and the separator was secured with a Teflon spacer 5. In addition, on the top surface of the separator, a negative electrode 6 comprising metallic Li was placed at the bottom, a spacer 7 overlaid with a negative terminal was placed, and from above, this was covered with an upper body 2, which was fastened with screws to seal the battery.

The electrolytic solution used was one in which EC and DMC mixed at 3:7 in volume served as a solvent, into which μmoL/L LiPF6 was dissolved as solute.

(Evaluation of Power Performance Characteristics)

The electrochemical cell prepared as described above was used to determine the power performance characteristics by the methods described below.

At 20° C., in a state charged to 50% SOC at 0.1 C, values for the currents so as to have discharge rates of 0.1 C, 1.0 C, 3.0 C, 5.0 C and 7.0 C were calculated from the contents of the positive electrode active materials in the positive electrodes, a current-voltage figure was constructed, plotting the 10-second voltage when discharging a constant current at the respective rates, which was extrapolated by the least square method to determine the current $I_{3.0}$ corresponding to 3.0V, the power performance was calculated from the formula below and indicated as a relative value when the value of comparative example 3 was taken as 100.

$$W = V \times I3.0$$

where

W: power performance (W)

V: discharge lower limit voltage 3.0 (V)

$I_{3.0}$: current (A) corresponding to 3.0V (Evaluation of Cycle Performance at High Temperature Life Characteristics)

The electrochemical cell prepared as described above was used to test charging-discharging and determine the cycle performance at high temperature life characteristics by the methods described below.

A cell was placed in an environment tester which was set in such a way that the ambient temperature at which the battery is charged-discharged was at 45° C., the cell was prepared so it could be charged-discharged, left for four hours so that the cell temperature reaches the ambient temperature, then, two cycles of charge-discharge were performed at 0.1 C with the charge-discharge range of 3.0V to 4.3V, then, with a charge-discharge depth of 50-80% SOC, charge-discharge cycle was performed 47 times at 1 C, and for the 50th cycle, in order to verify the capacity, charge-discharge was performed at 0.1 C with a charge-discharge range of 3.0V to 4.3V.

The percentage (%) of the value determined by dividing the discharge capacity at the 50th cycle by the discharge capacity at the 2nd cycle served as the value for cycle performance at high temperature life characteristics and was indicated as a relative value when the value of comparative example 3 was taken as 100.

(3 C Rate Discharge Capacity)

The electrochemical cell prepared as described above was used to determine 3 C rate discharge capacity by the methods described below.

First, at a temperature of 20° C., 2 cycles of charge-discharge were performed at 0.1 C with a charge-discharge range of 3.0V to 4.3V. Next, constant current charging at 0.1 C was performed to 4.3 V, and a constant current discharging at 3.0 C was performed to 3.0V. This measured discharge capacity (mAh/g) served as the 3 C rate discharge capacity. Note that the charge-discharge rate and discharge capacity were calculated from the amount of positive electrode active material in the positive electrode.

Example 1

Lithium carbonate, electrolytic manganese dioxide (contains 0.03 percent in mass Mg; TG diminution amount during 200° C.-400° C. heating: 3.0%), magnesium oxide and aluminum hydroxide were weighed as shown in Table 1, and these were mixed to obtain a mixed raw material.

The interior of a firing container (crucible made of alumina, size=length*width*height=10*10*5 (cm)) was filled with the obtained mixed raw material in such a way that the ratio between the open surface area and the filling height (open surface area $cm^2$/filling height cm) was 100. In so doing, the apparent density of the raw material was 1.1 g/$cm^3$.

Then, using a stationary electric furnace, as shown in Table 1, the temperature was raised at the rate of rise in temperature=150° C./hr from ordinary temperature to the set firing temperature, retained at the firing temperature (retention temperature) of 825° C. for 20 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of 815° C. to 835° C.

The fired powder obtained by firing was crushed with a mortar, sorted with a sieve having 75 μm openings, and the powder under the sieve was obtained as a sample.

When the obtained sample was analyzed by ICP by removing impurities such as $SO_4$, the composition shown in Table 2 was determined. In addition, the inter-atomic distances Li—O and Mn—O ("Li—O" and "Mn—O"), the crystallite size and the specific surface area (SSA) of the obtained sample are shown in Table 2, at the same time as the results of evaluation of the power performance characteristics ("power performance") and evaluation of the cycle performance at high temperature life characteristics ("cycle performance at high temperature") are shown in Table 2.

Note that in Table 2 of the priority application, due to the composition ratios of Mn alone being shown to the third decimal, the total of the composition ratios of Li, Mn, Mg and Al was not 3.00. Since this was an erroneous presentation, it was decided to show the ratio for Mn to the second decimal as well. Consequently, the sample per se is identical to the one in the priority application.

In addition, as indices of the reliability of the analysis results, the values of Rwp and GOF, which indicate the extent of the match between the observed intensities and the calculated intensities, are shown in Table 4.

Examples 2 to 9 and Comparative Examples 1 to 4

Samples were obtained similarly to Example 1, except that the mixing amount of each raw material, the ratio between the open surface area and the filling height (open surface area $cm^2$/filling height cm) and the firing temperature (retention temperature) were modified as indicated in Table 1.

The composition by ICP analysis, the inter-atomic distances Li—O and Mn—O ("Li—O" and "Mn—O"), the crystallite size, the specific surface area (SSA), the results from the evaluation of the power performance characteristics ("power performance") and the results from the evaluation of the cycle performance at high temperature life characteristics ("cycle performance at high temperature") of the obtained samples are shown in Table 2.

Example 10

As shown in Table 1, lithium carbonate, electrolytic manganese dioxide (contains 0.03 percent in mass Mg; TG diminution amount during 200° C.-400° C. heating: 3.0%), magnesium oxide and aluminum hydroxide, furthermore, with respect to the total weight thereof, 0.4 percent in weight of lithium borate (Li2B4O7) and water were mixed and stirred to prepare a slurry with a solid content concentration of 25 percent in weight.

To the obtained slurry (10 kg raw material powder), an ammonium salt of polycarboxylic acid (SN dispersant 5468, manufactured by San Nopco Limited) was added as dispersant at 3.5 percent in weight with respect to the slurry solid content, which was ground with a wet grinder at 1000 rpm for 20 minutes to obtain a mean particle diameter (D50) of 0.7 μm.

Next, the obtained ground slurry was granulated and dried using a heat spray dryer (spray dryer OC-16, manufactured by Ohkawara Kakohki Co., Ltd.). In so doing, granulation-drying was carried out using a rotating disc for spraying, at 24000 rpm rotation speed, 7.6 kg/hr slurry supply amount, and adjusting the temperature so that the drying tower exit temperature was 155° C.

The interior of a firing container (crucible made of alumina, size=length*width*height=10*10*5 (cm)) was filled with the obtained mixed raw material in such a way that the ratio between the open surface area and the filling height (open surface area $cm^2$/filling height cm) was 100.

Then, using a stationary electric furnace, as shown in Table 1, the temperature was raised at the rate of rise in temperature=150° C./hr from ordinary temperature to the set firing temperature, retained at the firing temperature (retention temperature) of 790° C. for 14 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of 780° C. to 800° C.

The fired powder obtained by firing was crushed with a mortar, sorted with a sieve having 63 μm openings, and the powder under the sieve was obtained as sample.

When the obtained sample was analyzed by ICP by removing impurities such as $SO_4$, it was determined that the composition was that shown in Table 3. The B amount was 0.1 percent in weight with respect to the lithium manganate having the composition in Table 3. In addition, the inter-atomic distances Li—O and Mn—O ("Li—O" and "Mn—O"), the crystallite size and the specific surface area (SSA) of the obtained sample are shown in Table 3, at the same time as the results of evaluation of the power performance characteristics ("power performance") and evaluation of the cycle performance at high temperature life characteristics ("cycle performance at high temperature") are shown in Table 3.

Figure 6:
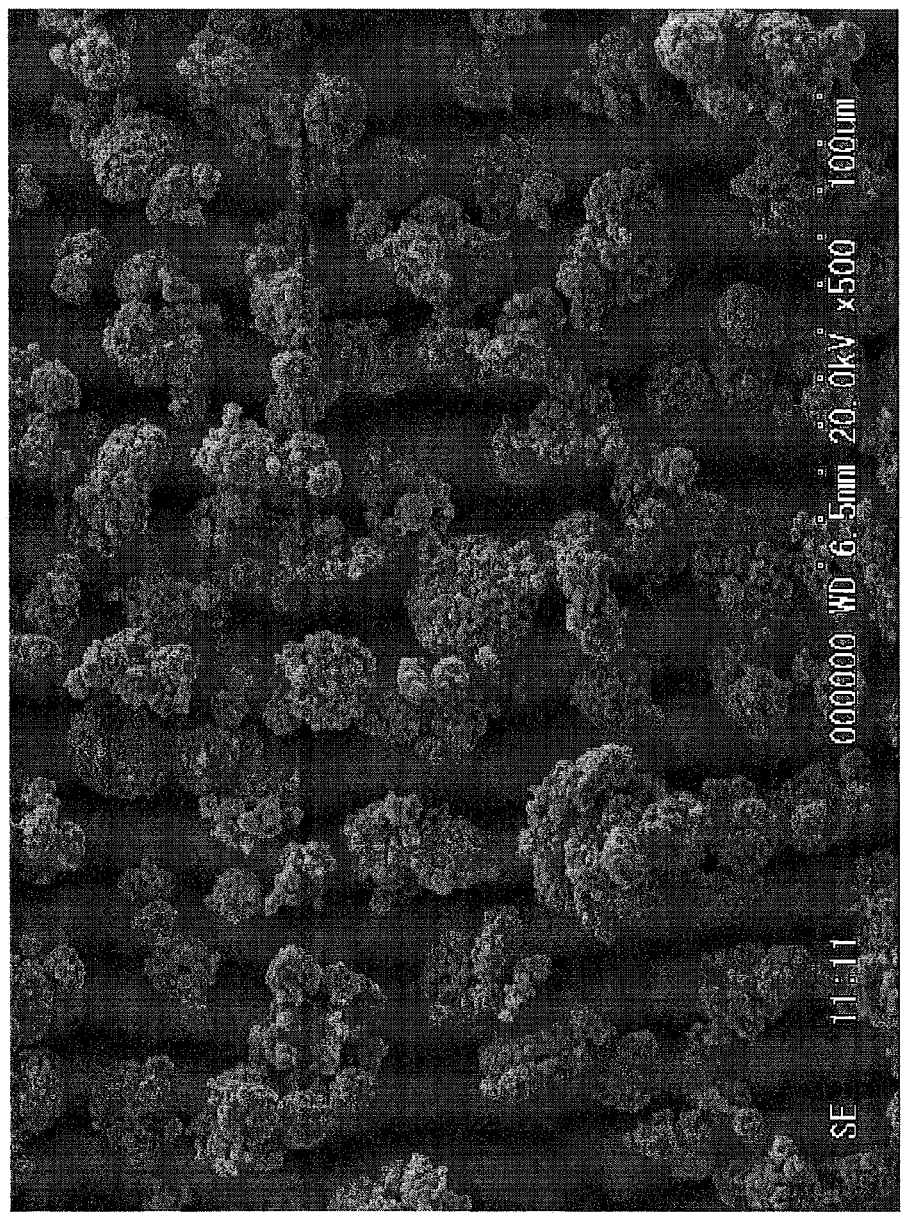
FIG. 6 is an SEM photograph of the sample obtained in Example 10.

In addition, when the sample obtained in Example 10 was observed on an SEM photograph, as shown in FIG. 6, it was determined to contain aggregated particles (secondary particles) which were aggregated spherically, although not all the aggregated particles (secondary particles) were aggregated spherically.

Further in addition, when the state of presence of boron (B) was checked for the sample obtained in Example 10 by the following tests, it was revealed that boron (B) did not constitute a spinel.

That is to say, when the sample obtained in Example 10 was immersed in water and stirred, it was determined that boron (B) eluted into water. In addition, when the lattice constants were measured with an XRD measurement apparatus and compared for a sample before and after immersion in water, since no significant difference was observed in the lattice constants before and after immersion, the spinet structure was found to be unaltered. Thus, it was demonstrated that the boron (B) in the sample obtained in Example 10 did not constitute a spinel and was not present within the spinel structure.

Comparative Example 6

Manganese dioxide (surface area: 80 $m^2/g$), lithium carbonate and aluminum hydroxide were weighed and mixed so as to obtain a molar ratio of Li:Mn:Al=1.05:1.90:0.10, then, to this mixture, 0.2 percent in weight of lithium borate ($Li_2B_4O_7$) was added and mixed with a ball mill, fired in an electric furnace at 750° C. and crushed to generate a lithium-manganese series composite oxide as a sample.

TABLE 1

|  | Weighing | | | | Open surface area ($cm^2$)/ Filling height (cm) | Rate of rise in temperature °C./hr | Firing temperature °C. |
| --- | --- | --- | --- | --- | --- | --- | --- |
|  | $Li_2CO_3$ | $MnO_2$ | MgO | $Al(OH)_3$ | | | |
| Example 1 | 20.13 | 84.46 | 0.66 | 4.76 | 100 | 150 | 825 |
| Example 2 | 20.13 | 84.46 | 0.66 | 4.76 | 100 | 150 | 850 |
| Example 3 | 20.13 | 84.46 | 0.66 | 4.76 | 100 | 150 | 875 |
| Example 4 | 20.13 | 84.46 | 0.66 | 4.76 | 100 | 150 | 900 |
| Example 5 | 20.23 | 85.37 | 1.29 | 3.11 | 100 | 150 | 825 |
| Example 6 | 20.23 | 85.37 | 1.29 | 3.11 | 100 | 150 | 850 |
| Example 7 | 20.23 | 85.37 | 1.29 | 3.11 | 100 | 150 | 875 |
| Example 8 | 20.23 | 85.37 | 1.29 | 3.11 | 100 | 150 | 900 |
| Example 9 | 20.13 | 84.46 | 0.66 | 4.76 | 100 | 150 | 815 |
| Comparative example 1 | 20.02 | 83.99 | 0.00 | 5.99 | 60 | 150 | 875 |
| Comparative example 2 | 20.02 | 83.99 | 0.00 | 5.99 | 60 | 150 | 900 |
| Comparative example 3 | 20.13 | 84.46 | 0.66 | 4.76 | 60 | 150 | 825 |
| Comparative example 4 | 20.13 | 84.46 | 0.66 | 4.76 | 60 | 150 | 900 |
| Example 10 | 1797.8 | 7714.0 | 57.5 | 430.7 | 100 | 150 | 790 |
| Comparative example 6 | 20.08 | 85.98 | 0.0 | 3.94 | 100 | 150 | 750 |

TABLE 2

|  | Composition | | | | Li—O Å | Mn—O Å | Crystallite size nm | SSA $m^2/g$ | Power performance % | Cycle performance at high temperature % |
| --- | --- | --- | --- | --- | --- | --- | --- | --- | --- | --- |
|  | Li | Mn | Mg | Al | | | | | | |
| Example 1 | 1.02 | 1.83 | 0.03 | 0.12 | 2.004 | 1.933 | 129 | 0.90 | 102 | 103 |
| Example 2 | 1.02 | 1.83 | 0.03 | 0.12 | 2.003 | 1.933 | 161 | 0.72 | 105 | 103 |
| Example 3 | 1.02 | 1.83 | 0.03 | 0.12 | 1.998 | 1.935 | 220 | 0.58 | 105 | 113 |
| Example 4 | 1.02 | 1.83 | 0.03 | 0.12 | 1.990 | 1.937 | 356 | 0.42 | 106 | 112 |
| Example 5 | 1.02 | 1.84 | 0.06 | 0.08 | 1.999 | 1.936 | 151 | 1.08 | 103 | 101 |
| Example 6 | 1.02 | 1.84 | 0.06 | 0.08 | 1.990 | 1.940 | 206 | 0.79 | 108 | 106 |
| Example 7 | 1.02 | 1.84 | 0.06 | 0.08 | 1.990 | 1.940 | 311 | 0.50 | 112 | 110 |
| Example 8 | 1.02 | 1.84 | 0.06 | 0.08 | 1.978 | 1.945 | 490 | 0.38 | 113 | 102 |
| Example 9 | 1.02 | 1.83 | 0.03 | 0.12 | 2.006 | 1.933 | 126 | 0.90 | 102 | 100 |
| Comparative example 1 | 1.02 | 1.83 | 0.00 | 0.15 | 2.010 | 1.931 | 169 | 0.60 | 95 | 100 |
| Comparative example 2 | 1.02 | 1.83 | 0.00 | 0.15 | 2.008 | 1.930 | 248 | 0.44 | 95 | 95 |
| Comparative example 3 | 1.02 | 1.83 | 0.03 | 0.12 | 2.008 | 1.931 | 82 | 1.05 | 100 | 100 |
| Comparative example 4 | 1.02 | 1.83 | 0.03 | 0.12 | 1.970 | 1.949 | 370 | 0.38 | 95 | 100 |

TABLE 3

| | Composition | | | | Li—O | Mn—O | Crystallite size | SSA | Tap density |
|---|---|---|---|---|---|---|---|---|---|
| | Li | Mn | Mg | Al | Å | Å | nm | m2/g | g/cc |
| Example 10 | 1.01 | 1.84 | 0.03 | 0.12 | 1.992 | 1.938 | 1435 | 0.31 | 1.67 |
| Comparative example 6 | 1.03 | 1.87 | 0 | 0.1 | 2.031 | 1.921 | 148 | 0.32 | 1.92 |

| | D10 μm | D50 μm | D90 μm | Dmax μm | CS m2/cc | Output % | High temperature % | 3C rate discharge capacity mAh/g |
|---|---|---|---|---|---|---|---|---|
| Example 10 | 9.8 | 19.1 | 31.7 | 74 | 0.36 | 102 | 116 | 108 |
| Comparative example 6 | 6.97 | 23.4 | 44.16 | 104.7 | 0.42 | 100 | 105 | 92.5 |

TABLE 4

| | Rwp | GOF |
|---|---|---|
| Example 1 | 7.3 | 1.93 |
| Example 2 | 7.0 | 1.87 |
| Example 3 | 6.6 | 1.75 |
| Example 4 | 5.7 | 1.52 |
| Example 5 | 6.5 | 1.69 |
| Example 6 | 6.1 | 1.62 |
| Example 7 | 5.9 | 1.55 |
| Example 8 | 5.1 | 1.35 |
| Example 9 | 7.3 | 1.94 |
| Comparative example 1 | 7.3 | 1.92 |
| Comparative example 2 | 6.2 | 1.63 |
| Comparative example 3 | 6.6 | 1.92 |
| Comparative example 4 | 5.7 | 1.55 |
| Example 10 | 5.7 | 1.53 |
| Comparative example 6 | 4.5 | 1.40 |

(Discussion)

Figure 2:
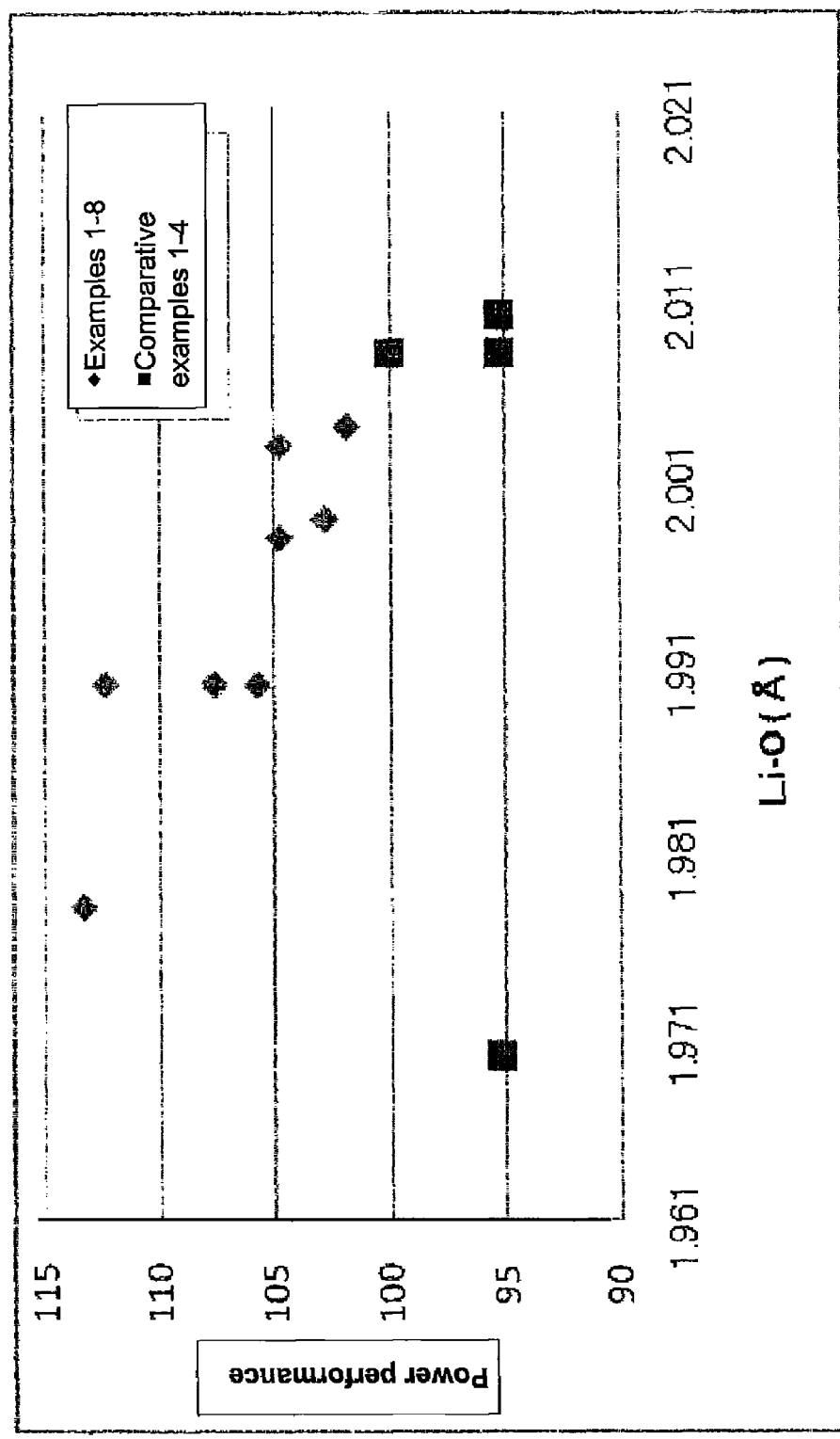
FIG. 2 is a graph showing the relationship between the inter-atomic distance Li—O ("Li—O") and the results of the evaluation of power performance characteristics ("power performance") for the samples obtained in the examples and comparative examples.

From FIG. 2, it was found that defining the inter-atomic distance Li—O to a given range allows the power performance characteristics to be raised. It was found that, in so doing, having an inter-atomic distance Li—O of 1.971 Å to 2.006 Å is important, 1.971 Å to 2.004 Å is desirable, in particular 1.978 Å to 2.004 Å is desirable, of which in particular 1.978 Å to 1.990 Å is desirable.

When the inter-atomic distance Li—O is shorter than 1.971 Å, it is expected that Li is immobilized and that Li ions have difficulties moving in the event of Li charging-discharging. Conversely, if it is longer than 2.006 Å, it is believed that a heterogeneous element contaminates the Li layer and prevents movements of Li ions.

Figure 3:
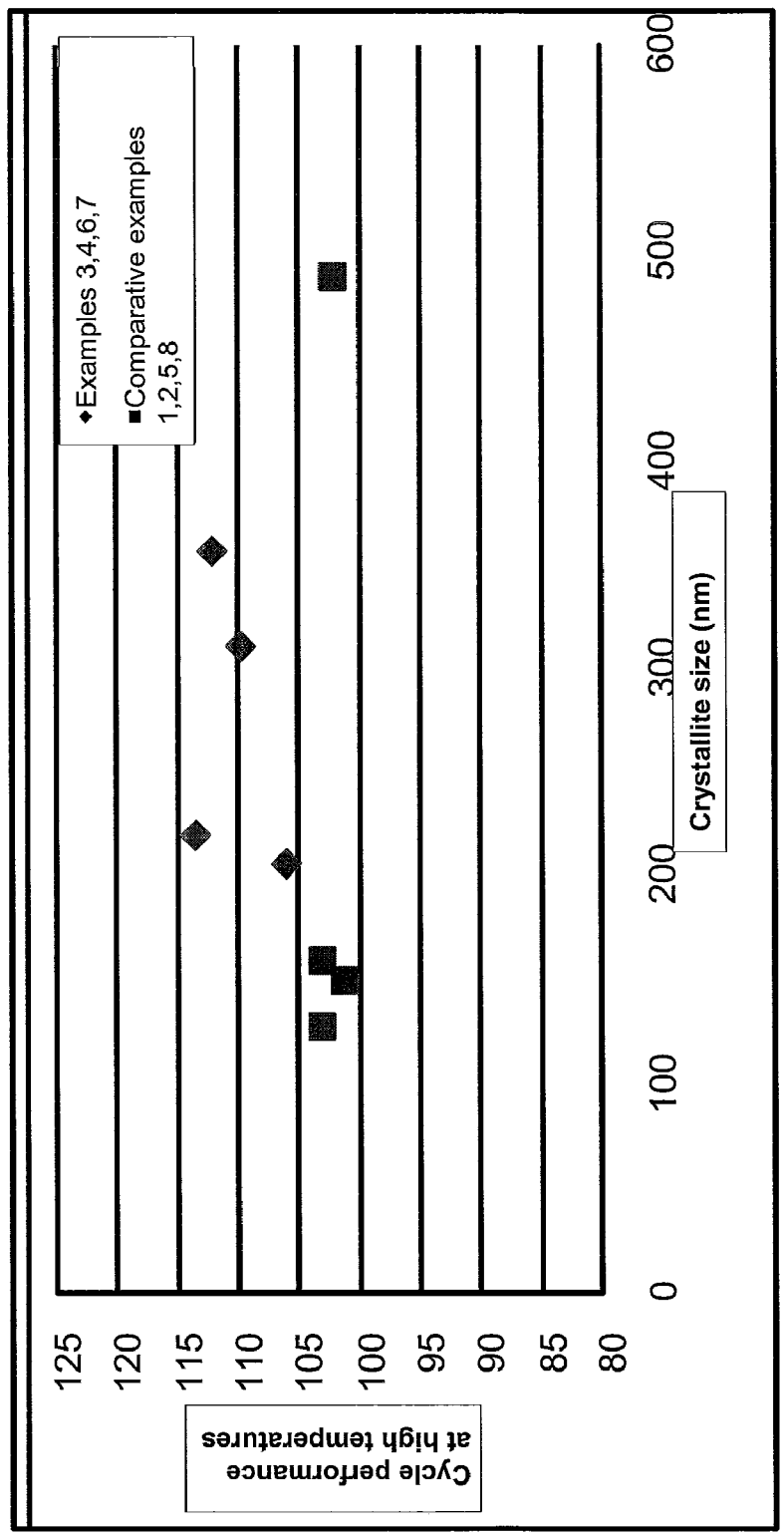
FIG. 3 is a graph showing the relationship between the crystallite size and the results of the evaluation of cycle performance at high temperature life characteristics ("cycle performance at high temperature") for the samples obtained in the examples and comparative examples.
Figure 4:
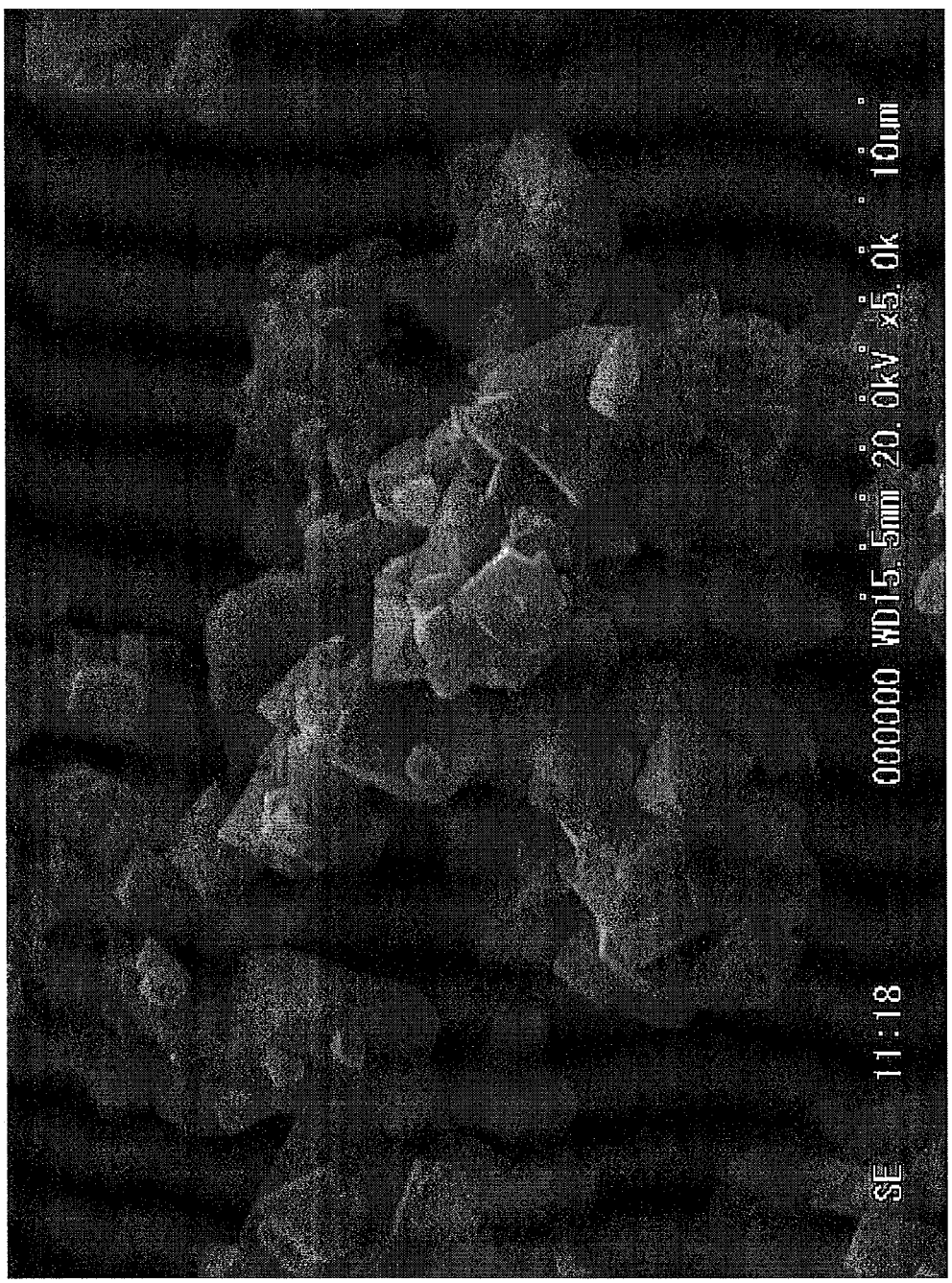
FIG. 4 is an SEM photograph of the sample obtained in Example 6.
Figure 5:
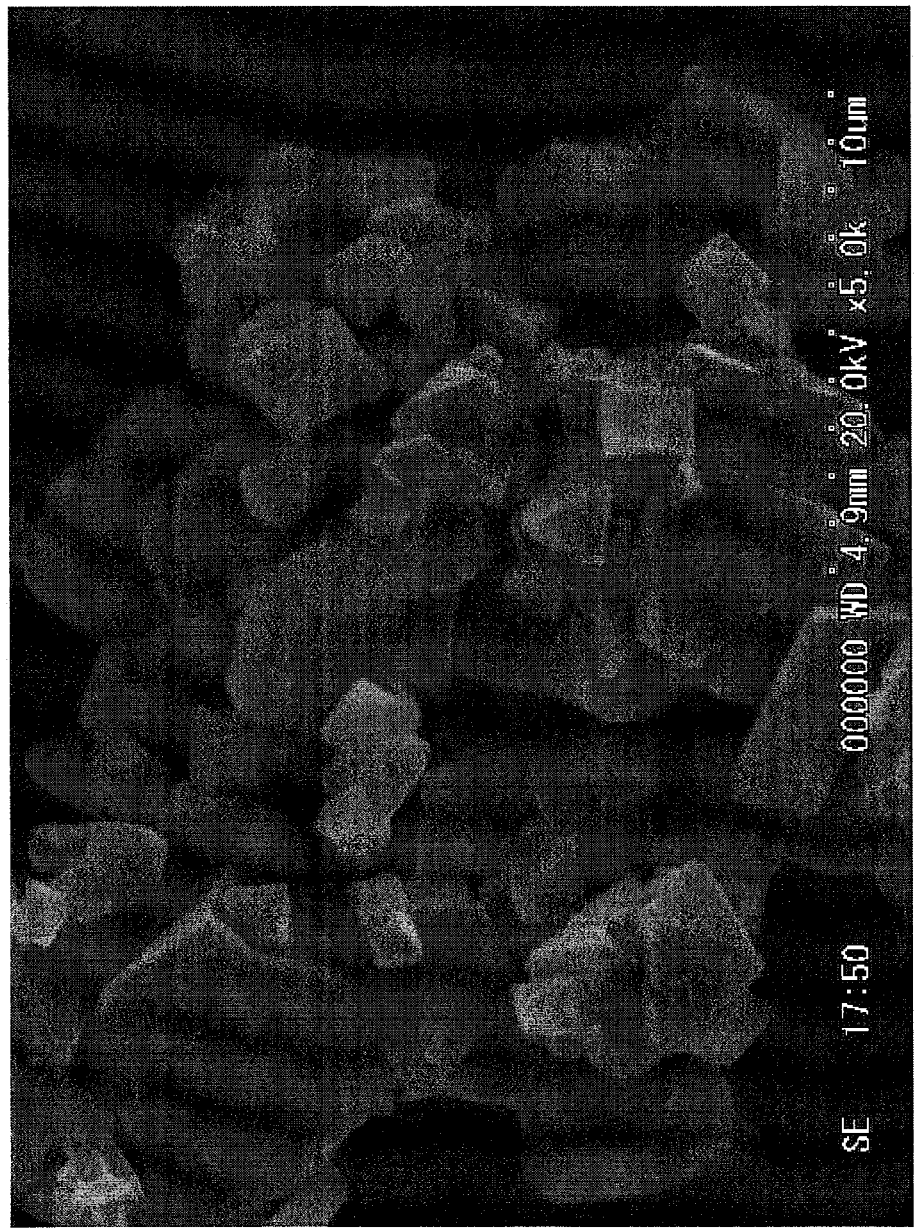
FIG. 5 is an SEM photograph of the sample obtained in Example 8.

From FIG. 3, it was found that defining the crystallite size to a given range in addition to the above conditions allows the cycle performance at high temperature life characteristics to be improved. It was also found that, in so doing, a crystallite size of 170 nm to 490 nm is desirable, in particular 170 nm to 480 nm is desirable, of which in particular 200 nm to 360 nm is desirable, of which 220 nm to 360 nm is more desirable. This is believed to be due to the fact that, the crystallite size having been optimized, the permeability of the electrolytic solution and the reactive surface area when discharged at a high current value are maintained, thereby decreasing the substantial electric current density, attenuating the resistance of movement of the lithium ions on the boundary surface.

In addition, Example 10, which contains a boron compound, was revealed to have high filling density (tap density), large crystallite size and high discharge capacity at high-load discharge (3 C) compared to a spinel type lithium transition metal oxide not containing a boron compound (for instance Example 1) or the like. Furthermore, it was also revealed that, while adding a boron compound and firing a spinel type lithium transition metal oxide promotes sintering and decreases the specific surface area, which conventionally makes it difficult to obtain a power performance, defining the inter-atomic distance Li—O to a given range allows the power performance to be increased.

The invention claimed is:

1. A spinel type lithium transition metal oxide, which is a spinel type Fd3-m lithium transition metal oxide represented by the general formula $Li_{1+x}M_{2-x}O_4$, wherein M is a transition metal consisting of three elements Mn, Al and Mg and x is 0.01 to 0.08, and wherein the inter-atomic distance Li—O is 1.978 Å to 2.006 Å as measured by the Rietveld method using the fundamental method.

2. The spinel type lithium transition metal oxide according to claim 1, wherein the inter-atomic distance Li—O is 1.978 Å to 2.004 Å.

3. The spinel type lithium transition metal oxide according to claim 1, which is a lithium transition metal oxide represented by the general formula $Li(Li_xMg_yAl_zMn_{2-x-y-z})O_4$, wherein $0.01 \leq x \leq 0.08$, $0.02 \leq y \leq 0.07$ and $0.06 \leq z \leq 0.14$.

4. The spinel type lithium transition metal oxide according to claim 2, which is a lithium transition metal oxide represented by the general formula $Li(Li_xMg_yAl_zMn_{2-x-y-z})O_4$, wherein $0.01 \leq x \leq 0.08$, $0.02 \leq y \leq 0.07$ and $0.06 \leq z \leq 0.14$.

5. The spinel type lithium transition metal oxide according to claim 1, wherein the crystallite size is 170 nm to 490 nm.

6. The spinel type lithium transition metal oxide according to claim 2, wherein the crystallite size is 170 nm to 490 nm.

7. The spinel type lithium transition metal oxide according to claim 1, wherein the specific surface area is 0.35 to 0.80 $m^2/g$.

8. The spinel type lithium transition metal oxide according to claim 2, wherein the specific surface area is 0.35 to 0.80 $m^2/g$.

9. A positive electrode active material ingredient for a lithium battery containing the spinel type lithium transition metal oxide according to claim 1 and a boron compound.

10. A positive electrode active material ingredient for a lithium battery containing the spinel type lithium transition metal oxide according to claim 3 and a boron compound.

11. The positive electrode active material ingredient for a lithium battery according to claim 9 containing aggregated particles which are aggregated spherically.

12. The positive electrode active material ingredient for a lithium battery according to claim 10 containing aggregated particles which are aggregated spherically.

13. The positive electrode active material ingredient for a lithium battery according to claim 9, wherein the crystallite size of the spinel type lithium transition metal oxide is 500 nm to 2000 nm.

14. The positive electrode active material ingredient for a lithium battery according to claim 10, wherein the crystallite size of the spinel type lithium transition metal oxide is 500 nm to 2000 nm.

15. The positive electrode active material ingredient for a lithium battery according to claim 11, wherein the crystallite size of the spinel type lithium transition metal oxide is 500 nm to 2000 nm.

16. The positive electrode active material ingredient for a lithium battery according to claim 12, wherein the crystallite size of the spinet type lithium transition metal oxide is 500 nm to 2000 nm.

17. A lithium battery for a hybrid electric vehicle provided with the spinel type lithium transition metal oxide according to claim 1 as a positive electrode active material.

18. A lithium battery for a hybrid electric vehicle provided with the spinel type lithium transition metal oxide according to claim 2 as a positive electrode active material.

19. A lithium battery for a hybrid electric vehicle provided with the spinel type lithium transition metal oxide according to claim 9 as a positive electrode active material.

20. A lithium battery for a hybrid electric vehicle provided with the spinet type lithium transition metal oxide according to claim 11 as a positive electrode active material.

* * * * *